(12) United States Patent
Shiraki et al.

(10) Patent No.: US 6,445,792 B1
(45) Date of Patent: *Sep. 3, 2002

(54) ECHO CANCELLER FOR DECREASING A DETERIORATION FACTOR OF A SPEECH QUALITY

(75) Inventors: Koichi Shiraki; Ikuo Kajiyama, both of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/779,128

(22) Filed: Jan. 6, 1997

(30) Foreign Application Priority Data

Apr. 25, 1996 (JP) .............................. 8-105538

(51) Int. Cl.[7] ................................. H04M 9/08
(52) U.S. Cl. .................... 379/410; 379/406; 379/411; 370/286
(58) Field of Search ................. 379/410, 411, 379/406, 409, 407, 388, 1, 3, 345; 370/286, 289, 282; 364/700, 724.011, 724.19

(56) References Cited

U.S. PATENT DOCUMENTS

| 4,852,161 A | * | 7/1989 | Hagiwara | 379/410 |
| 4,894,820 A | * | 1/1990 | Miyamoto | 379/410 |
| 4,922,530 A | * | 5/1990 | Kenney et al. | 379/411 |
| 5,247,512 A | | 9/1993 | Sugaya et al. | |
| 5,307,405 A | * | 4/1994 | Sih | 379/410 |
| 5,343,521 A | * | 8/1994 | Jullien et al. | 379/410 |
| 5,483,594 A | | 1/1996 | Prado et al. | |
| 5,513,265 A | * | 4/1996 | Hirano | 379/410 |
| 5,563,944 A | * | 10/1996 | Hasegawa | 379/410 |
| 5,577,097 A | * | 11/1996 | Meek | 379/406 |
| 5,699,424 A | * | 12/1997 | Hirano | 379/410 |

FOREIGN PATENT DOCUMENTS

| JP | 60125025 A | 7/1985 |
| JP | 61056526 A | 3/1986 |
| JP | 60162937 | 2/1987 |
| JP | 01027325 A | 1/1989 |
| JP | 06014100 A | 1/1994 |
| JP | 06022025 A | 1/1994 |
| JP | 06188789 A | 7/1994 |

OTHER PUBLICATIONS

K. Honma (1986) Kabushiki Kaisha Nihon Kogyo Gijyutsu Center "*Echo Canceller Technology*".

* cited by examiner

*Primary Examiner*—Forester W. Isen
*Assistant Examiner*—Jefferey Harold

(57) ABSTRACT

An echo canceller which estimates an echo gain from a reception signal level and a transmission signal level; calculates logarithmically converted power of a reception signal level; calculates logarithmically converted power of a transmission signal level; estimates an echo gain based on the reception signal level and the transmission signal level; adds the estimated echo gain to the reception signal level to obtain an estimated echo level, calculates logarithmically converted power of a residual signal level; and compares the estimated echo level with the residual signal level after echo cancellation; wherein the echo of the reception signal contained in the transmission signal is canceled when the estimated echo level exceeds the value obtained by adding a margin to the residual signal level.

10 Claims, 14 Drawing Sheets

ECHO CANCELLER FOR DECREASING A DETERIORATION FACTOR OF A SPEECH QUALITY

BACKGROUND OF THE INVENTION

1. Field of the Invention

The invention relates to an echo canceller for canceling an echo signal which becomes a deterioration factor of a speech quality in satellite communications and telephones with loudspeakers.

2. Description of the Prior Art

An example of conventional echo cancellers is disclosed in (1) "Echo canceller technique", Japan Industrial Technical Center, Dec. 20, 1986, pp. 129–130. An example of the filter coefficient substitution method of conventional echo cancellers is disclosed in (2) the laid-open patent publication No. 62-24726. The construction of the conventional echo canceller is explained below, along with FIGS. 8–14.

FIG. 8 is a block diagram of the conventional echo canceller 30 explained in the above literature (1). In FIG. 8, Rin (k) represents a reception signal at k (where, k represents a certain time of digital signal), in other words it represents the voice of the caller at the far end. In case of an echo canceller used for a telephone with a speaker, an echo path 1 corresponds to a path in which the voice of the far-end caller, reproduced from the speaker, goes into a microphone via sound space. And in case of the echo canceller used for satellite communication channel, the echo path 1 represents the path in which the voice of the far-end caller leaks out to that of the near end talker by impedance mismatching of a hybrid transformer used for two-line/four line conversion.

Since the echo signal passes through the echo path 1, the reception signal Rin (k) is superposed on the near-end voice Nin (k). Therefore, a transmission signal Tin (k) contains not only the near-end voice but also the superposed far-end voice echo. If Tin (k) is transmitted to the far-end as it is, the communication quality deteriorates. In the echo canceller 30, an adaptive filter 3 generates a pseudo echo signal Tin' (k). An echo subtracter 2 subtracts the pseudo echo signal Tin' (k) from the transmission signal Tin (k) to generate a residual signal Res (k) in which the echo component is canceled. The residual signal Res (k) is transmitted to the far-end.

An adaptive controller 4 controls the adaptive filter 3. When the double-talk is detected, in other words when the far-end caller and the near-end caller are both speaking simultaneously, the adaptive controller 4 stops the adaptation. When only the far-end caller is speaking, the adaptive controller 4 outputs an adaptive control flag FLG to the adaptive filter 3 in order to activate the adaptation.

The adaptive controller 4 will hereinafter be described further in detail, using FIG. 9. FIG. 9 shows the adaptive controller 4 in the conventional echo canceller which is disclosed in the above literature (1). A level calculator 5 calculates logarithmically converted power of the reception signal Rin (k), in other words calculates a reception signal level Lrin (k) from a time k to a time prior to the L-th sampling according to formula (1), and outputs its result. A level calculator 6 calculates logarithmically converted power of the residual signal Res (k), in other words calculates the residual signal level Lres (k) from a time k to a time prior to the L-th sampling according to formula (2), and outputs its result. Then a level difference calculator 7 calculates DL (k), a level difference between the reception signal level Lrin (k) and the residual signal level Lres (k), according to formula (3). In the following formulas, L denotes a duration from a time k to a time prior to the L-th sampling, N denotes an average number to ensure the level difference DL (k).

$$Lrin(k) = \log_{10}\left\{\sum_{i=k-L+1}^{k} Rin(i)^2\right\} \quad (1)$$

$$Lres(k) = \log_{10}\left\{\sum_{i=k-L+1}^{k} Res(i)^2\right\} \quad (2)$$

$$DL(k) = \sum_{i=k-N+1}^{k} \{Lrin(i) - Lres(i)\}/N \quad (3)$$

The level difference DL (k) is equal to the sum of the amount of echo loss via the echo path and the amount of echo canceling by the echo canceller. A level compensator 8 calculates an estimated residual signal level Lres' (k) according to formula (4).

$$Lres'(k) = Lrin(k) - DL(k)$$

Where, Lres' (k) represents an estimated value of the residual signal level Lres (k) at the time when only the echo signal of the reception signal exists in the transmission signal Tin (k), in other words when only the far-end caller is speaking.

The comparator 9 compares the residual signal level Lres (k) and the estimated residual signal Lres' (k). In case that the result meets the conditional formula (5) below, the comparator 9 judges that both the far-end caller and the near-end caller are speaking, that is to say, that double-talk condition is occurred. Then the comparator 9 sets the adaptive control flag FLG to "0" in order to stop the adaptation of the adaptive filter.

$$Lres(k) > Lres'(k)$$

Where, FLG="1" represents the activation order of the adaptation, and FLG="0" represents the deactivation order of the adaptation.

Adaptation control is a process in which whether the near-end voice level reaches a level for stopping the adaptation processing is judged, then the activation or the deactivation of the adaptation is controlled. The activation and the deactivation of the adaptation should be controlled according to a relationship between the echo signal level in the transmission signal Tin (k) and the near-end voice level. When the level of near-end voice exceeds the level of the echo signal by the far-end signal, the adaptation processing is deactivated. On the other hand, as shown in FIGS. 10A~10D, in case that the echo signal level exceeds the near-end voice level, or in case that the echo signal level exceeds the value added to the near-end voice level by a certain margin, the adaptation should be activated. FIG. 10A shows a relationship between the near end voice level Nin (k) and the echo signal level Rin' (k). FIG. 10B shows a near-end voice sections in the reception signals Tin (k). FIG. 10C shows an echo signal section in the reception signals Tin (k). FIG. 10D shows sections where the adaptation of the conventional adaptive filter should be executed.

FIG. 11A shows a relationship between the near end voice level Nin (k) and the echo signal level Rin' (k). FIG. 11B shows near-end voice sections in the reception signals Tin (k). FIG. 11C shows an echo signal section in the reception signals Tin (k). FIG. 11D shows a relationship between residual signal level Lres (k) and the estimated residual signal level Lres' (k). FIG. 11D shows sections where the adaptation of the conventional adaptive filter is executed.

In the conventional art, the double talk is detected from the residual signal level Lres (k) and the estimated residual signal level Ires' (k) in the comparator 9. Therefore, if the residual signal level Lres (k) and the estimated residual signal level Lres' (k) are nearly equal, as shown in FIG. 11D, the adaptation is deactivated by partly mis-detecting the condition as double talk condition even in a section (a) where only the echo signal is contained in the transmission signal Tin (k). In addition, if the residual signal level Lres (k) exceeds the estimated residual signal level Lres' (k) adaptation is deactivated, even in a section (b) shown in FIG. 11 where the adaptation should be carried out because echo signal level exceeds the near-end voice level.

FIGS. 12A~12E shows another example of relationship between the near end voice level and the echo signal level and sections where the adaptation of the conventional adaptive filter is executed. In FIGS. 12A~FIG. 12E, if the residual signal level Lres (k) exceeds the estimated residual signal level Lres' (k), adaptation is deactivated, even in a section (b) shown in FIG. 12C where the adaptation should be carried out because echo signal level exceeds the near-end voice level.

The construction of filter coefficient substitution method in the conventional echo canceller is explained below, using FIG. 13 and FIGS. 14A~FIG. 14C.

FIG. 13 is a block diagram of the conventional echo canceller disclosed in the above literature (2). The construction of the conventional example of FIG. 13 is different from that of the conventional example in FIG. 8, in that FIG. 13 comprises a switch means 12, a refuge memory 13, a coefficient substitution controller 15 but does not include the adaptive controller 4. In addition, an adaptive memory 10, a sum/product calculator 11 and a filter coefficient updator 14 in FIG. 13 comprises the adaptive filter 3 in FIG. 8. Therefore, there are structural difference between the conventional example in FIG. 13 and the conventional example in FIG. 8. The elements having the same reference numbers in FIG. 13 are the same portions or the corresponding portions in FIG. 8. Accordingly the detailed explanation of the same portions is omitted.

The adaptive memory 10 stores a first filter coefficient for updating which is generated from the transmitting signal and the residual signal after echo cancellation using algorithm. The refuge memory 13 stores the first filter coefficient which is to be stored in the adaptive memory 10 in parallel for a predetermined sections while the adaptation is judged to be proper. The coefficient substitution controller 15 controls whether the update of the filter coefficient used for the adaptation of the adaptive filter is proper or not, according to the difference between the transmitting signal level and the residual signal level.

First of all, the filter coefficient updator 14 updates the filter coefficient H (j) of the adaptive memory 10 from the transmission signal Tin (k) and the residual signal Res (k) according to a filter algorithm such as N-LMS method (learning identification method). The sum/product calculator 11 generates a pseudo echo signal by carrying out the convolution operation of the reception signal Rin (k) and the filter coefficient H (j) stored in the adaptive memory 10. On the other hand, the coefficient substitution controller 15 calculates transmission signal level Ltin (k) and the residual signal level Lres (k) according to formulas (6) and (2), respectively, and further calculates the difference Ds (k) between Ltin (k) and Lres (k) according to formula (7).

$$Ltin(k) = \log_{10}\left\{\sum_{i=k-L+1}^{k} Tin(i)^2\right\} \quad (6)$$

$$Ds(k) = Ltin(k) - Lres(k) \quad (7)$$

FIGS. 14A~FIG. 14C show timing charts of Ds (k), transfer processing and of substituting processing by the switching device 12. In FIG. 13 and FIG. 14B, H (6) shows the first filter coefficient of the adaptive memory 10, and Hm (j) shows the second filter coefficient of the refuge memory 13. If Ds (k) increases as shown in FIG. 13A, transfer timing pulses in FIG. 14B are generated in response to the increase of the Ds (k) and the first filter coefficient of the adaptive memory is transferred to the refuge memory 13 in order to store the first filter coefficient H (j) as a second filter coefficient Hm (j). On the other hand, if Ds (k) decreases as shown in FIG.13A, substitution timing pulses in FIG. 14C are generated in response to the decrease of the Ds (k) and the second filter coefficient of the refuge memory 13 is transferred to the adaptive memory 10 in order to substitute the second filter coefficient Hm (j) for the first filter coefficient H (j).

Next, coefficient substitution controller 15 monitors the time sequence of Ds (k). When the Ds (k) becomes larger, the coefficient substitution controller 15 judges that the adaptation of the adaptive filter is running correctly, and sends an order to the switching device 12 so as to transmit the first filter coefficient of the adaptive memory 10 to the refuge memory 13. Then the switching device 12 transmits the first filter coefficient to the refuge memory 13 according to the order. As a result, the first filter coefficient of the adaptive filter 10 is stored in the refuge memory 13 as a second filter coefficient.

On the other hand, when the Ds (k) becomes smaller, the coefficient substitution controller 15 judges that the adaptation of the adaptive filter is running incorrectly, and sends an order to the switching device 12 so as to substitute the first filter coefficient of adaptive memory 10 with the value of the second filter coefficient stored in the refuge memory 13. Then the switching device 12 transfers the second filter coefficient to the adaptive memory 10 according to the order.

In in the conventional echo canceller discussed above, double talk can not be detected properly. Therefore, a adaptation is deactivated even in the section where the adaptation should be carried out. Since the adaptation is deactivated frequently, the processing of the adaptation is slow and therefore the echo still remains without being canceled. There has been another problem that when the amount of the echo cancellation by the adaptive filter is small, the residual echo prevents clear listening.

It is an object of the present invention to obtain an echo canceller which judges the double talk section precisely and carries out the adequate adaptation.

It is another object of the present invention to obtain an echo canceller in which substitution value is not discontinuous and does not produce a noise at a moment of substitution, even when the filter coefficient in the adaptive memory is substituted by the refuge value.

SUMMARY OF THE INVENTION

According to one aspect of the invention, an echo canceller including an adaptation control means which includes an echo level estimating means, the echo level estimating means comprising a first level calculating means for calculating logarithmically converted power of a reception signal level; a second level calculating means for calculating logarithmically converted power of a transmission signal level; an echo gain estimation means for estimating an echo gain based on the reception signal level and the transmission signal level; and an echo level estimating means for adding the estimated echo gain to the reception signal level to obtain an estimated echo level.

According to another aspect of the invention, the echo canceller further comprises a third level calculating means for calculating logarithmically converted power of a residual signal level; and a comparison means for comparing the estimated echo level with the residual signal level after the echo cancellation; wherein the echo of the reception signal contained in the transmission signal is canceled when the estimated echo level exceeds the value obtained by adding a margin to the residual signal level.

According to further aspect of the invention, the echo canceller further comprises a comparison means for comparing the estimated echo level with the transmitting signal level; wherein the echo of the reception signal contained in the transmission signal is canceled when the estimated echo level exceeds the value obtained by subtracting a margin from the transmitting signal level.

According to further aspect of the invention, the echo canceller further comprises a third level calculating means for calculating logarithmically converted power of a residual signal level; a first comparison means for comparing the estimated echo level with a residual signal level after the echo cancellation; a second comparison means for comparing the estimated echo level with the transmission signal level; a flag selector for selecting an adaptive control flag outputted from the comparator and an adaptive control flag outputted from the comparator; and an echo cancellation amount estimating means for estimating an amount of echo cancellation from the transmission signal level and the residual signal level; wherein the echo of the reception signal included in the transmission signal is canceled if the estimated echo level exceeds the value obtained by adding the margin to the residual signal in case that the amount of the echo cancellation exceeds a threshold value, and the echo of the reception signal contained in the transmission signal is canceled if the estimated echo level exceeds the value obtained by subtracting a margin from the transmission signal in case that the amount of the echo cancellation does not exceed the threshold value.

According to still further aspect of the invention, an echo canceller comprises an adaptive memory for storing a first filter coefficient for adaptation which is updated from a transmission signal and a residual signal after echo cancellation; a refuge memory for storing a second filter coefficient in the adaptive memory in parallel for predetermined sections while the adaptation is judged to be proper; a coefficient substitution means for controlling whether the filter coefficient for the adaptation of the adaptive filter is needed to be updated or not according to the difference between the transmission signal and the residual signal level; an interpolating means for interpolating after comparing the value of the first filter coefficient in the adaptive memory with the value of the second filter coefficient in the refuge memory; a filter coefficient updator for updating the first filter coefficient of the adaptive memory according to the transmission signal and the residual signal; a sum/product calculator for generating a pseudo echo signal by carrying out the convolution operation according to the reception signal and the first filter coefficient stored in the adaptive memory; and an echo subtracter for subtracting the pseudo echo signal from the transmission signal to generate a residual signal; wherein, when the coefficient substitution mean controls to substitute the value of the first filter coefficient by the value of the second filter coefficient in case that the adaptation is not proper, and the interpolation means carries out interpolation and updates for a predetermined timing number so that the value of the first filter coefficient is continuous to the value of the second filter coefficient.

DETAILED DESCRIPTION OF THE PREFERRED EMBODIMENTS

Embodiment 1

The first embodiment which improves the adaptive control of the adaptive filter is described below.

Figure 1:
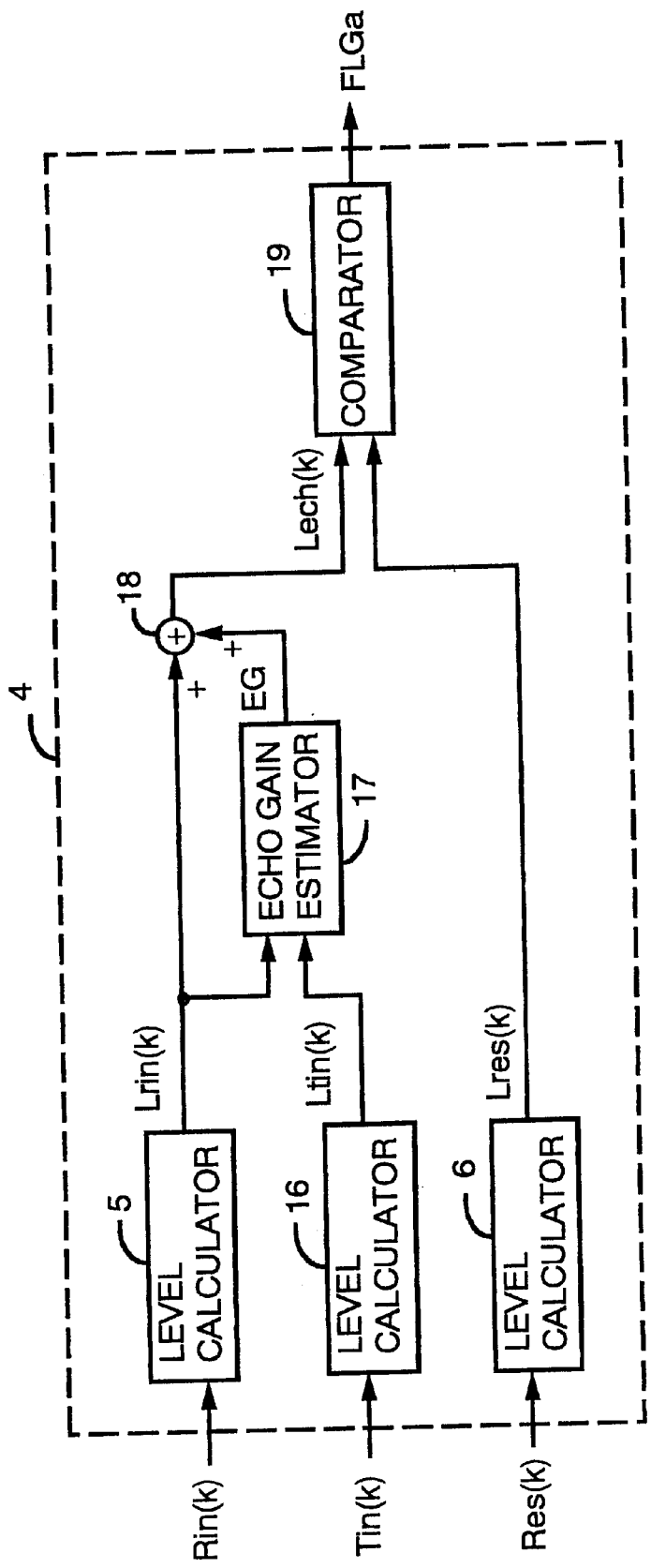
FIG. 1 shows a construction of the adaptive controller in the first embodiment of this invention.

FIG. 1 is a block diagram of the adaptive controller in the first embodiment of this invention. The elements having the same reference numbers in FIG. 1 are the same portions or the corresponding portions in FIG. 9. Accordingly the detailed explanation of the same portions is omitted.

Figure 8:
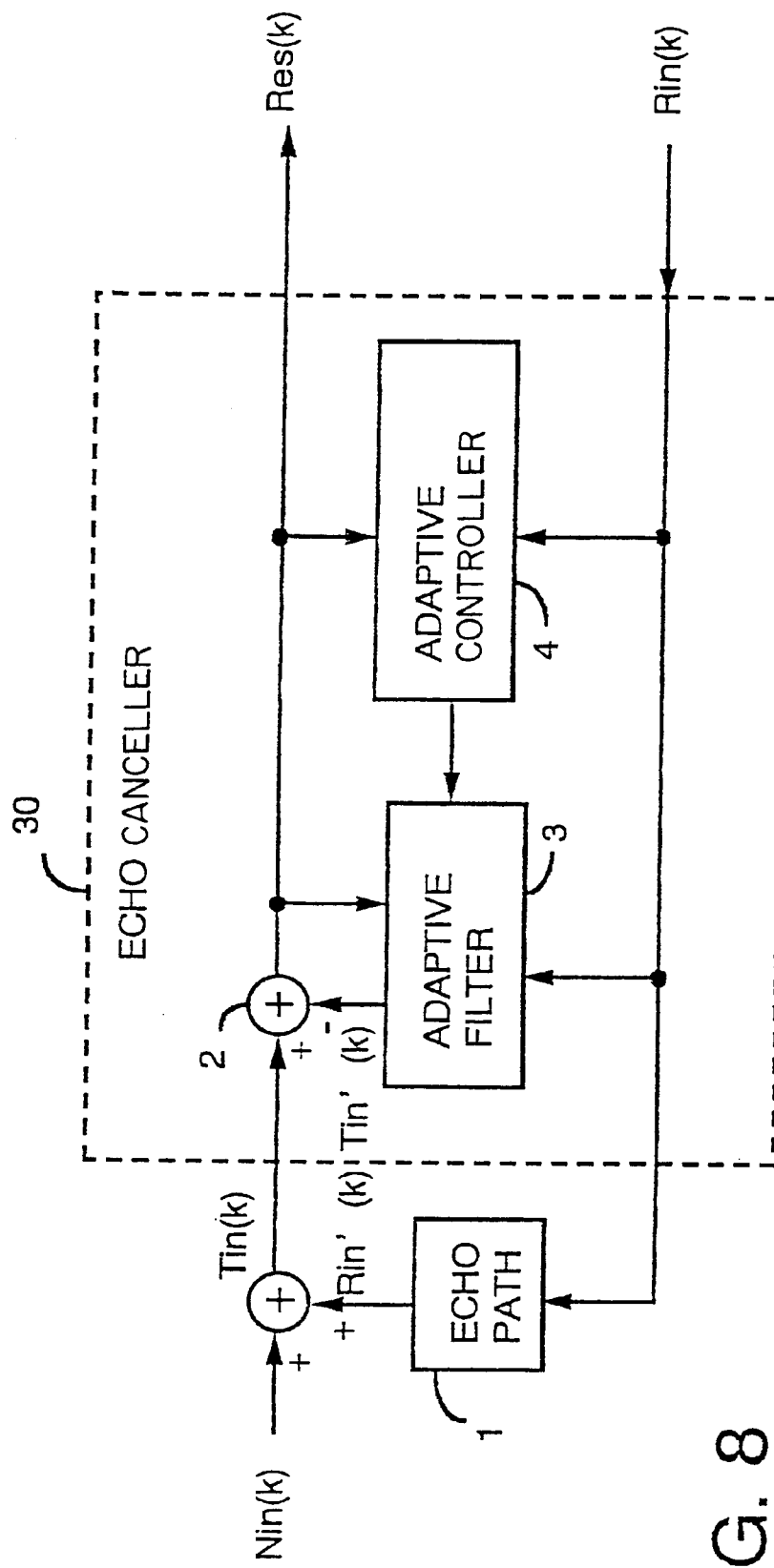
FIG. 8 shows the entire construction of the conventional echo canceller.

The adaptive controller 4 is an element in the echo canceller of FIG. 8. The adaptive controller 4 receives the digital signal reception signal Rin (k), the transmission signal Tin(k) and the residual signal Res (k) and outputs an adaptive control flag FLGa.

The level calculators 5, 16, 6 calculate and output the reception signal level Lrin (k), the transmission signal level Ltin (k), the residual signal level Lres (k), respectively. The word "level" here denotes a logarithmic conversion value of the signal power.

The echo gain estimator 17 calculates the estimated echo gain EG according to formula (8) from the reception signal level Lrin (k) and the transmission signal level Ltin (k), when the reception signal level Lrin (k) exceeds the sound threshold value. In other words, the echo gain estimator 17 calculates the equivalent transmission gain of the reception signal appeared at the transmission end via the echo path, as an average value of the several sequential sections. This value is normally fixed in a system, but it is calculated occasionally, for example, once a several hundred milliseconds, in the present invention.

The adaptive controller 4 can estimate the echo gain precisely, because it uses the average value of the level differences between the reception signal level and the transmission signal level at the time when the reception signal has an obvious sound level.

$$EG = \sum_{i=k+l+1}^{k} \{Ltin(i) - Lrin(i)\}/l \tag{8}$$

An echo level estimator 18 calculates an estimated echo level Lech (k) according to formula (9). That is to say, the echo level estimator 18 estimates the amount of reception signals appearing as the echo in the transmission signal in case that the near-end signal does not exist.

$$Lech(k) = Lxin(k) + EG \tag{9}$$

The comparator 19 compares the value of the residual signal level Lres (k) added by the margin α with the estimated echo level Lech (k), and sets the adaptive control flag FLGa to "1" when it meets the conditional formula (10) and sets the adaptive control flag to "0" when it does not meet the conditional formula (10), and then outputs the adaptive control flag FLGa.

$$Lech(k) \geq Lres(k) + \alpha \tag{10}$$

The operation of the invention is explained below using the FIG. 2 in case that the amount of the echo cancellation is large, in other words in case that the adaptation is fully activated and the echo is adequately canceled. In order to set the adaptive control flag FLGa of the invention, the residual signal level Lres (k) is compared with the estimated echo level Lech (k), as shown in the conditional formula (10).

Figures 2A, 2B, 2C, 2D, 2E:
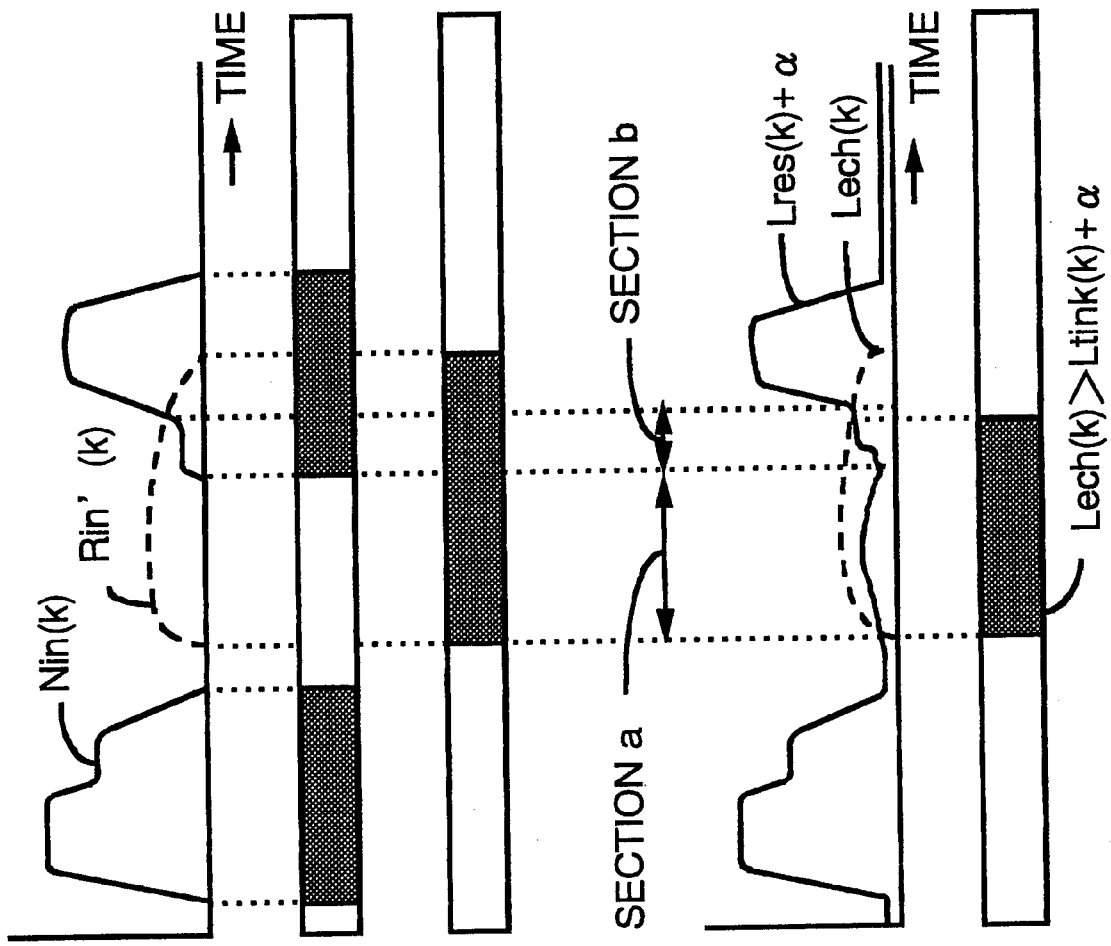
FIGS. 2A~2E show diagrams which explain the operation of the adaptive controller in the first embodiment of this invention.

FIG. 2A shows a relationship between the near-end voice level Nin (k) and the echo signal level Rin' (k). FIG. 2B shows a near-end voice sections in the transmission signals Tin (k). FIG. 2C shows an echo signal section in the transmission signals Tin (k). FIG. 2D shows a relationship between residual signal level Lres (k)+margin α and the estimated echo signal level Lech (k). FIG. 2E shows sections where the adaptation of the conventional adaptation filter is executed.

When the amount of the echo cancellation is large, the residual signal level Lies (k) is almost equal to the near-end voice level, and the estimated echo level Lech (k) is almost equal to the echo signal level. As stated above, an ideal parameter used for controlling the adaptation is the near-end voice level and the echo signal level. Therefore, in this invention, a more preferable parameter is used, in comparison with the conventional example using the residual signal level Lres (k) and the estimated residual signal level Lies' (k).

Figures 11A, 11B, 11C, 11D, 11E:
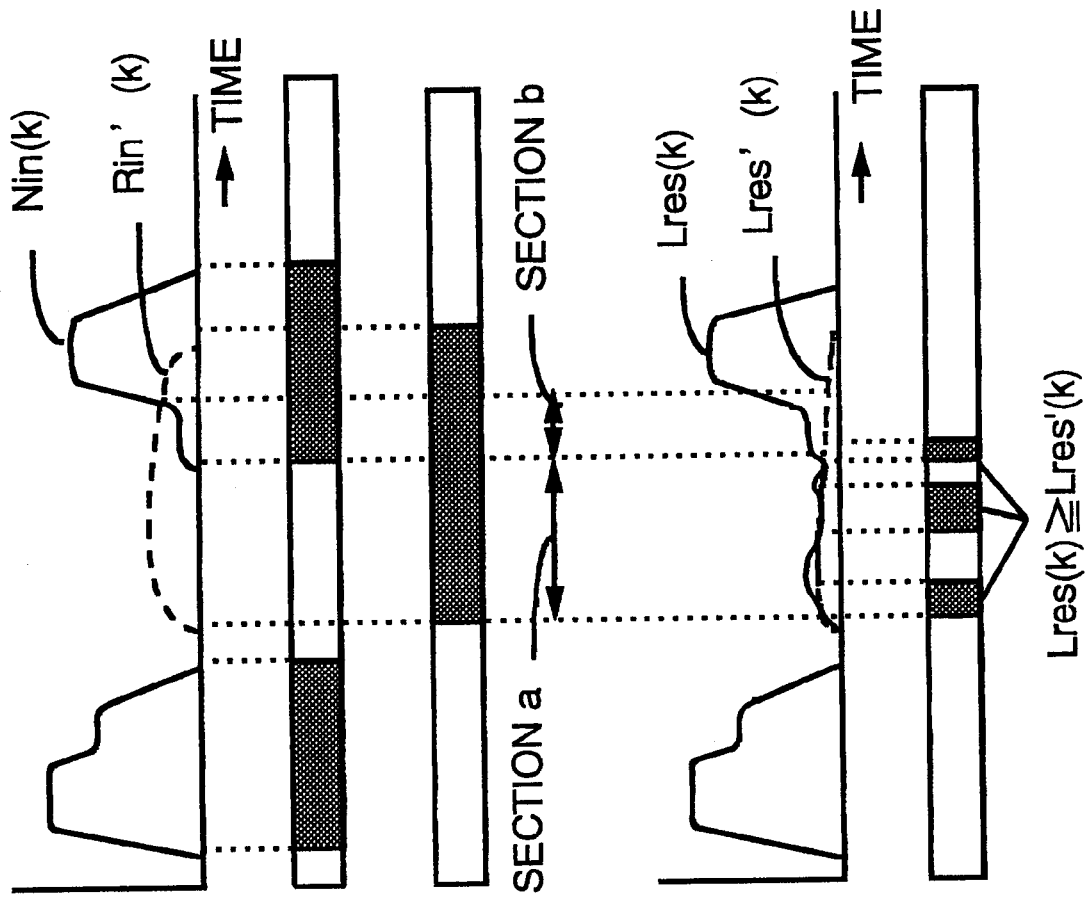
FIGS. 11A~11E show sections in which the adaptation of the conventional adaptive filter is performed.

Thus, the adaptation can be activated over the more sections than the adaptation of the conventional example depicted in FIG. 11. That is to say, in the section where only the echo signal is contained in the transmission signal Tin (k) shown in section (a) in FIG. 2C, the estimated echo level Lech (k) always exceeds the residual signal level Lres (k)+margin α, i.e. the approximation of the near-end voice level as shown in FIG. 2D. Therefore, the adaptive control flag FLGa is continuously set to "1" as shown in FIG. 2E. Moreover, even in sections such as the section (b) in FIG. 2C, where the echo signal level exceeds the near-end signal level during the double talk, the estimated echo level Lech (k) exceeds the residual signal level Lres (k)+margin α in the same manner as in the section "a". Therefore, the adaptive control flag FLGa is set to "1" as shown in FIG. 2E, during the section (b) in FIG. 2C.

Where, the margin α in the conditional formula (10) is used to absorb an error which is deviated from the true echo level, since the error is caused by approximating the near-end voice level by the residual signal level Lres (k) and the echo level Lech (k) is obtained by the estimation. As described above, according to this invention, a better adaptation control can be achieved by the comparison of the above signals when the amount of the echo canceling is large.

Embodiment 2

The second embodiment which improves the adaptive control of the adaptive filter is described below.

Figure 3:
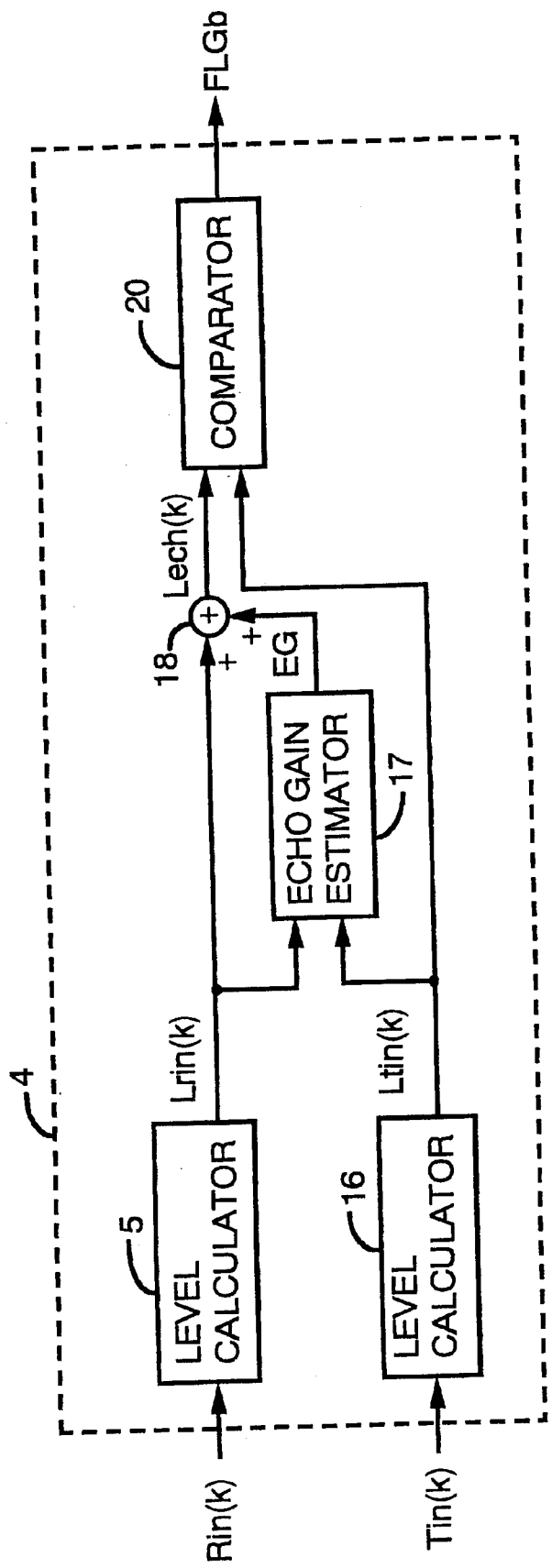
FIG. 3 shows a construction of the adaptive controller in the second embodiment of this invention.

FIG. 3 is a block diagram of the adaptive controller 4 in the second embodiment of this invention. The elements having the same reference numbers in FIG. 3 are the same portions or the corresponding portions in FIG. 1 and FIG. 9. Accordingly the detailed explanation of the same portions is omitted.

Figure 9:
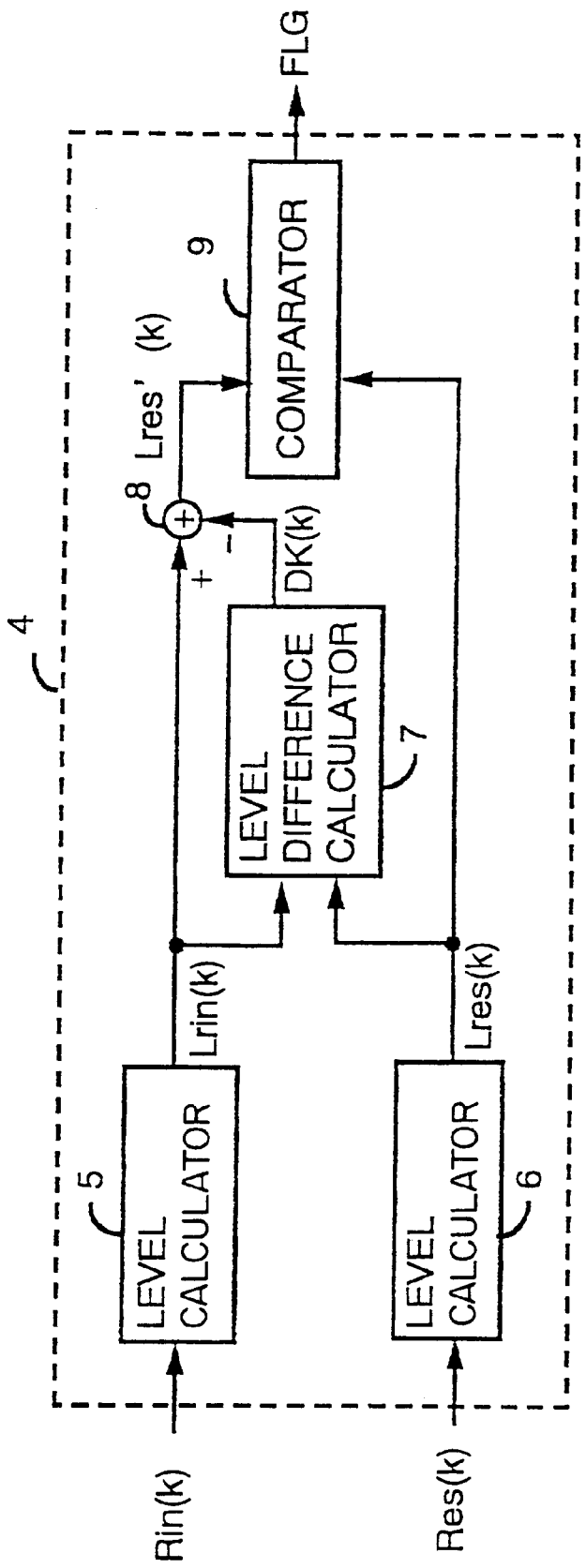
FIG. 9 shows the construction of the conventional adaptive controller.
Figures 10A, 10B, 10C, 10D:
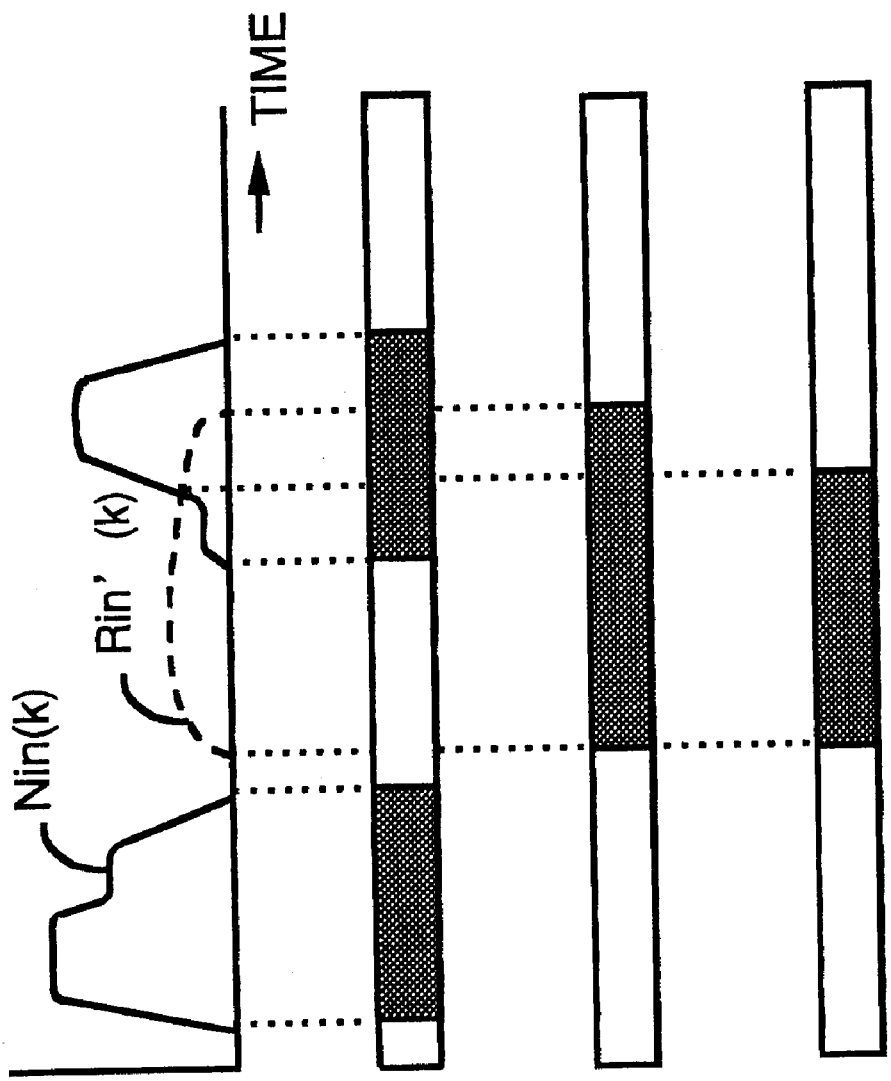
FIGS. 10A~10D show sections in which the adaptation of the adaptive filter should be performed.

This adaptive controller 4 is the same as the adaptive controller 4 in the echo canceller of FIG. 9. The adaptive controller 4 receives the reception signal Rin (k) and the transmission signal Tin (k) both of which are digital signals, and outputs an adaptive control flag FLGb.

The level calculators 5, 16 calculate and output the reception signal level Lrin (k) and the transmission signal level Ltin (k), respectively, in the same way as in the first embodiment. The echo gain estimator 17 and the echo level estimator 18 calculate the estimated echo gain EG and the estimated echo level Inch (k), respectively, in the same way as in the first embodiment.

When the transmission signal level Ltin (k), margin β, and the estimated echo level Lech (k) meet the conditional formula (11) below, the comparator 20 sets the adaptive control flag FLGb to "1". When they do not meet the conditional formula (11), the comparator 20 sets the adaptive control flag FLGb to "0".

$$Lech(k) \geq Ltin(k) - \beta \tag{11}$$

The operation of the invention is explained below using the FIG. 2 in case that the amount of the echo cancellation is small, in other words in case that the adaptation is not fully activated and the echo is not adequately canceled. In order to set the adaptive control flag FLGb of the invention, the transmission signal level Ltin (k) is compared with the estimated echo level Lech (k), as shown in the conditional formula (11).

Figures 4A, 4B, 4C, 4D, 4E:
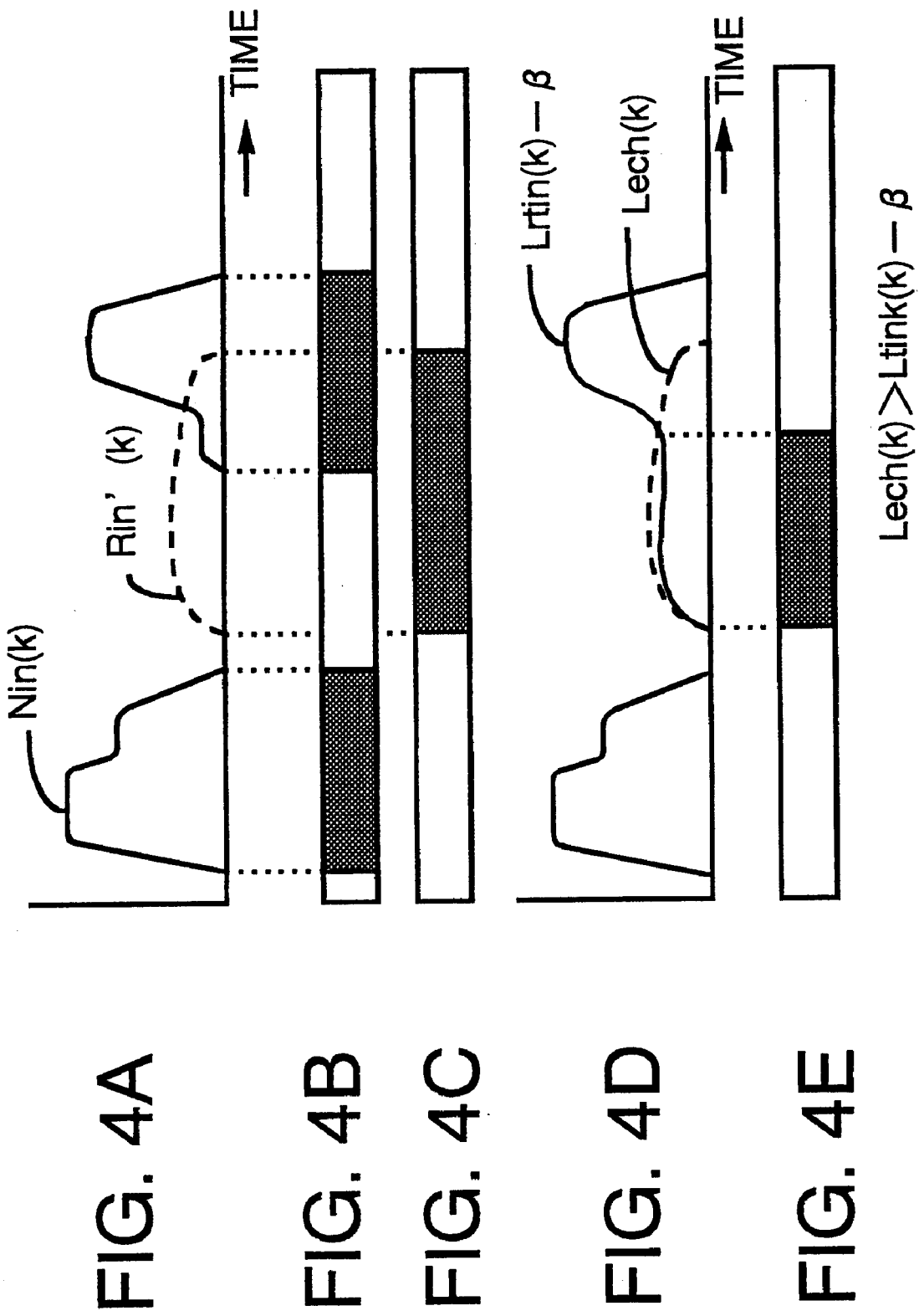
FIGS. 4A~4E show diagrams which explain the operation of the adaptive controller in the second embodiment of this invention.

FIG. 4A shows a relationship between the near end voice level Nin (k) and the echo signal level Rin' (k). FIG. 4B shows a near-end voice sections in the reception signals Tin (k). FIG. 4C shows an echo signal section in the reception signals Tin (k). FIG. 4D shows a relationship between transmission signal level Ltin (k) margin B and the estimated echo signal level Lech (k). FIG. 4E shows sections where the adaptation of the conventional adaptation filter is executed.

When the near-end voice is not contained in the transmission signal Tin (k), the transmission signal level Ltin (k) is the same as the echo signal level. Therefore the transmission signal level Ltin (k) becomes almost equal to the estimated echo level Lech (k). During the double talk where the near-end signal and the far-end signal overlap, since the transmission signal level Ltin (k) includes an overlapped near-end voice and echo signal, the transmission signal level (Ltin (k)–margin β) exceeds the estimated echo level Lech (k). On the other hand, the sections where only the echo signal is included in the transmission signal Tin (k), the estimated echo level Lech (k) exceed the transmission signal level (Ltin (k)–margin β) as shown in FIG. 4D.

Figures 12A, 12B, 12C, 12D, 12E:
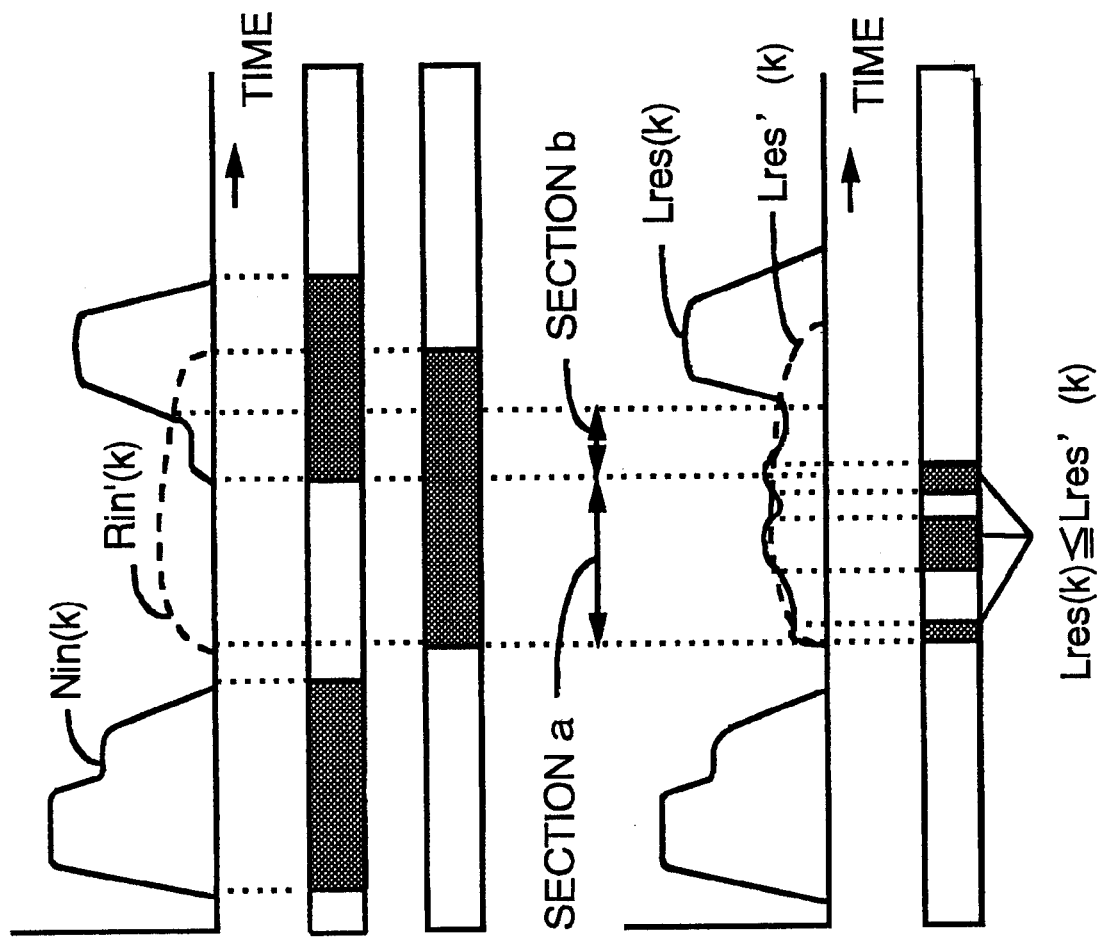
FIGS. 12A~12E show other sections in which the adaptation of the conventional adaptive filter is performed.

Accordingly, by comparing the transmission signal level (Ltin (k)–margin β) with the estimated echo level Lech (k), the sections where only the echo signal is included in the transmission signal Tin (k) can be accurately estimated, and the adaptive control flag FLGb is set to "1" as shown in FIG. 4E. Thus, the adaptation of the present invention can be activated over more sections than the that of the conventional examples depicted in FIG. 12E.

Where, the margin β in the conditional formula (11) is used to absorb the error which is deviated from the true echo level, since the echo level lech (k) is obtained by the estimation. As described above, according to this invention, a better adaptation control can be achieved by the comparison of the above signals when the amount of the echo canceling is small.

Embodiment 3

In addition, the third embodiment which improves the adaptive control of the adaptive filter is described below.

Figure 5:
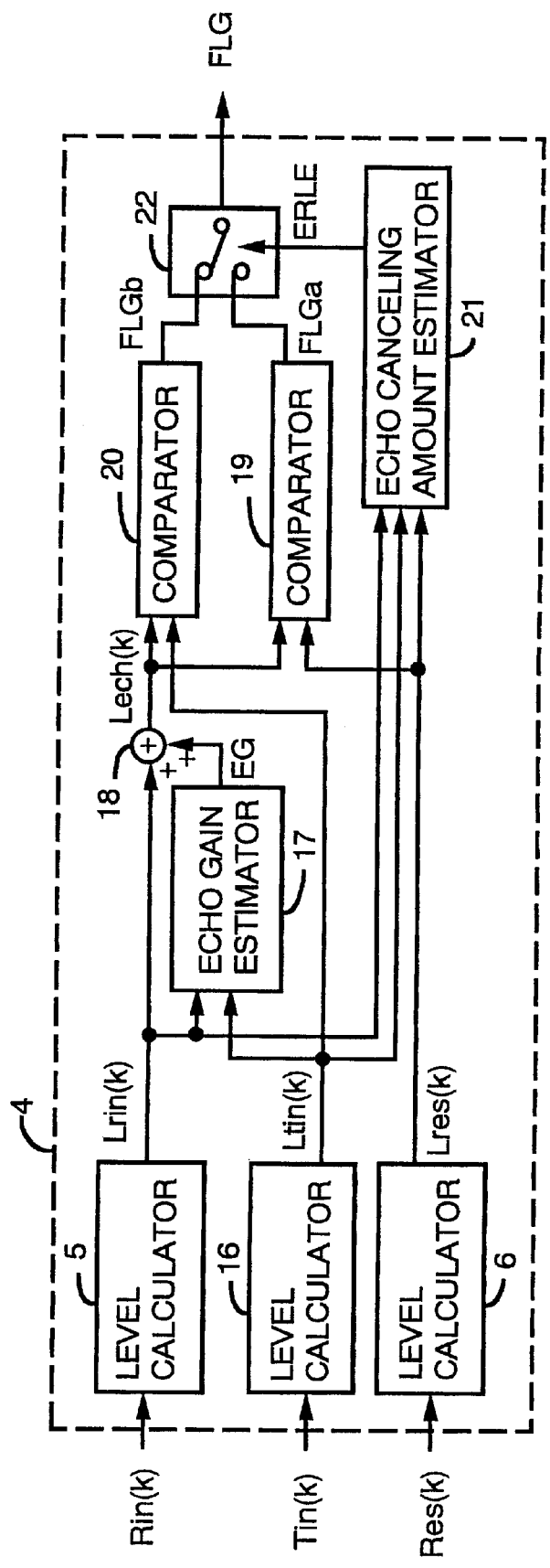
FIG. 5 shows a construction of the adaptive controller in the third embodiment of this invention.

FIG. 5 is a block diagram of the adaptive controller 4 in the third embodiment of this invention. The elements having the same reference numbers in FIG. 3 are the same portions or the corresponding portions in FIG. 1 and FIG. 9. Accordingly the detailed explanation of the same portions is omitted.

This adaptive controller 4 is also the same as the adaptive controller 4 in the echo canceller of FIG. 9. The input and the output of the adaptive controller 4 is the same manner as those of FIG. 1 and FIG. 3. Level calculators 5, 16, 6 calculate and output the reception signal level Lrin (k) and the transmission signal level Ltin (k) and the residual signal level Lres (k), in the same way as in the first embodiment. The word "level" here denotes the logarithm conversion value of power.

The echo gain estimator 17 and the echo level estimator 18 calculate the estimated echo gain EG and the estimated echo level Lech (k), respectively, in the same way as in the first embodiment. Since the adaptive controller 4 uses the average value of the level difference between the reception signal and the residual signal when the reception signal is obviously recognized as sound, the amount of the echo cancellation can be estimated precisely. The comparators 19 and 20 set the adaptive control flags FLGa and FLGb and outputs them to the selector 22, as in the first and the second embodiments.

The echo cancellation amount estimator 21 calculates an estimated echo cancellation ERLE from the transmission signal level Ltin (k) and the residual signal level Lres (k) according to formula (12) when the reception signal level Lrin (k) exceeds the sound threshold value.

$$ERLE = \sum_{i=k-K+1}^{k} \{Ltin(i) - Lres(i)\} / K \quad (12)$$

When the estimated echo cancellation ERLE exceeds the threshold value, in other words when the estimated echo cancellation ERLE is relatively large, the flag selector 22 outputs the adaptive control flag FLGa outputted from the comparator 19 as a final adaptive control flag FLG. When the estimated echo cancellation ERLE does not exceed the threshold value, in other words when the estimated echo cancellation ERLE is relatively small, the flag selector 22 outputs the adaptive control flag FLGb outputted from the comparator 20 as a final adaptive control flag FLG. Where, FLG="1" represents the execution order of the adaptation to the adaptive filter, and FLG="0" represents the deactivation order to the adaptive filter.

The reason why the both adaptive control flags FLGa and FLGb are used is to perform the better adaptation control regardless of the amount of the echo cancellation.

As already explained above in the first and the second embodiments, the adaptive control flag FLGa is effective for the better adaptation control when the echo cancellation is large, and FLGb is effective when the echo cancellation is small.

As explained above, this invention makes it possible to perform the better adaptation control regardless of the amount of the echo cancellation, because both adaptive control flags FLGa and FLGb are employed according to the amount of the echo cancellation.

In addition, margins α and β can absorb the errors since the error is caused by approximating the near-end voice level by the residual signal level Lies (k) and the echo level Lech (k) is obtained by the estimation.

Embodiment 4

Another embodiment, which deactivates the noise generation when substituting the filter coefficient of the sum/product calculator according to the adaptation control, is explained below.

Figure 6:
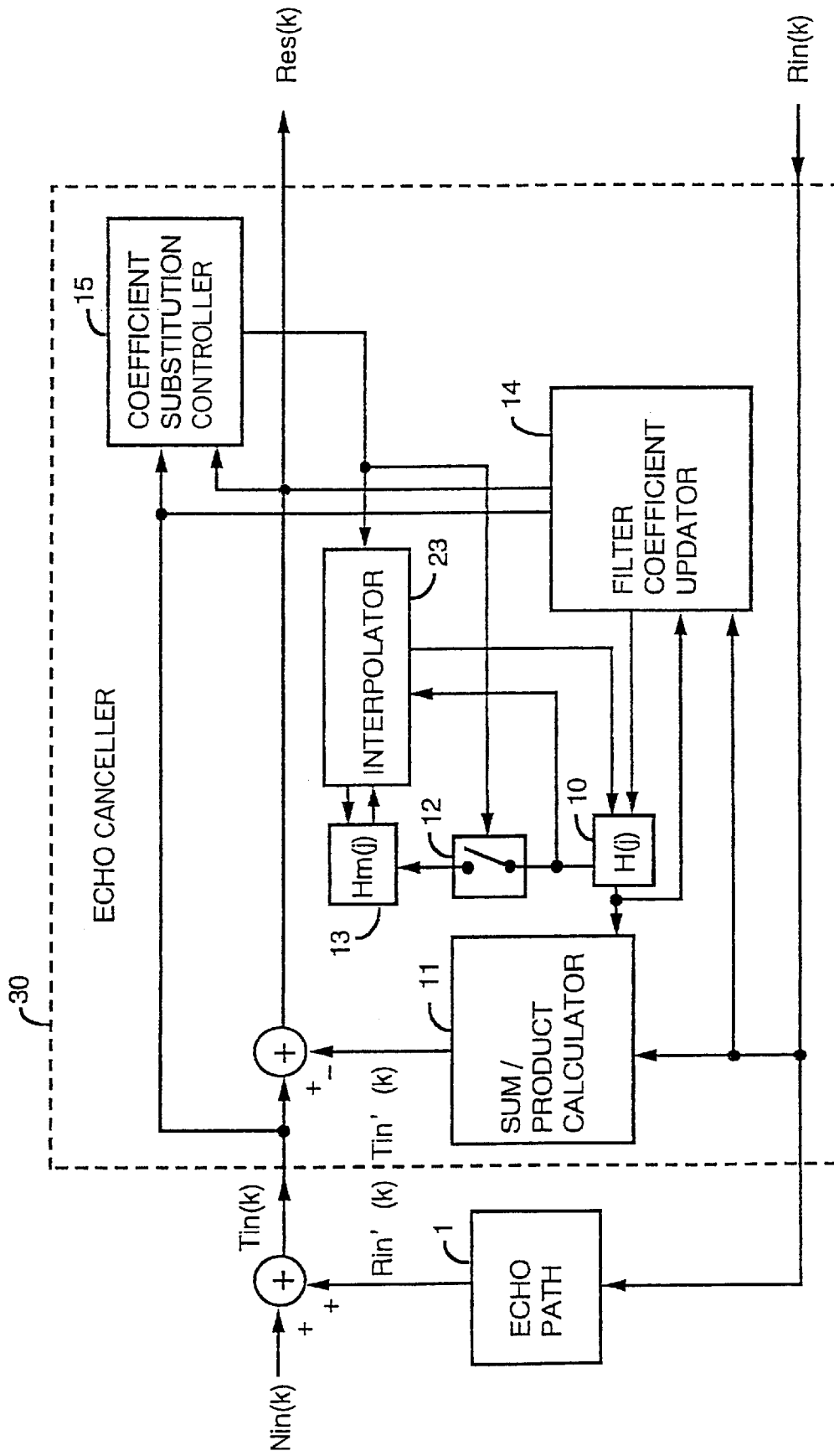
FIG. 6 shows an echo canceller which contains a filter coefficient substitution device in the fourth embodiment of this invention.
Figure 13:
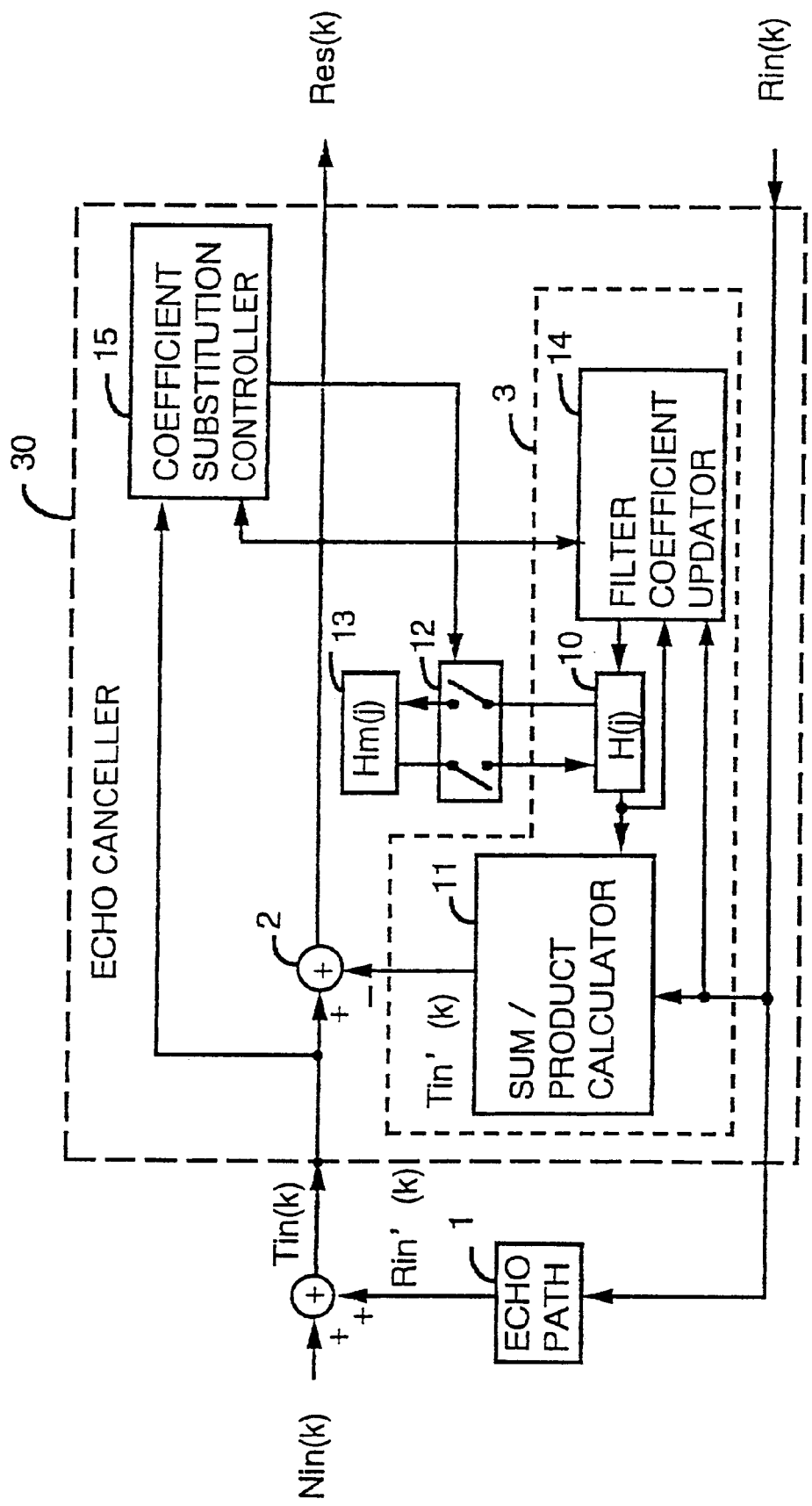
FIG. 13 shows an echo canceller which uses the conventional filter coefficient substitution method.
Figures 14A, 14B, 14C:
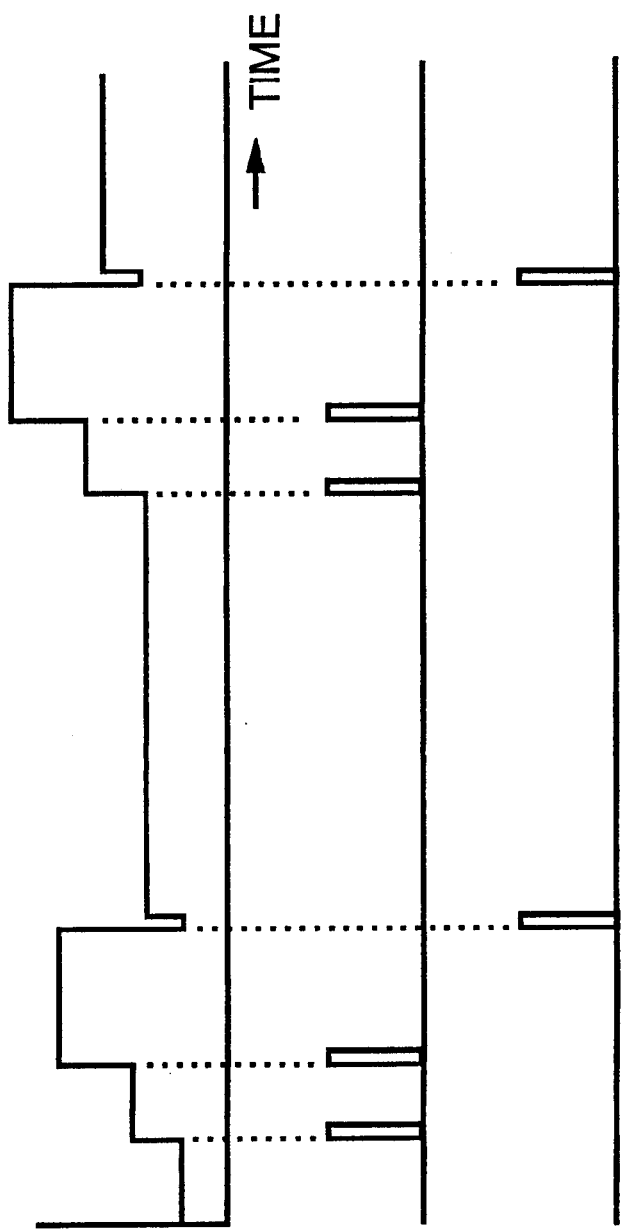
FIGS. 14A~14C show diagrams which explain the operation of the conventional coefficient substitution method.

FIG. 6 is a block diagram of the echo canceller equipped with the filter coefficient substitution device of the fourth embodiment of the invention. Elements commonly numbered in FIG. 6 and FIG. 13 are not provided with a detailed explanation here, since those elements are described above in connection with FIG. 13.

In FIG. 6, receiving an order from the coefficient substitution controller 15 as to transfer the value of the first filter coefficient in the adaptive memory 10 to the refuge memory 13, the switching device 12 performs to transfer the value of the filter coefficient according to the order as in the conventional art. However, in the present embodiment, receiving an order to replace the value of the first filter coefficient in the adaptive memory 10 with the value in the refuge memory 13, the switching device 12 does not respond at all. This point is largely different from the prior art.

When an interpolator 23 receives the order from the coefficient substitution controller 15 to replace the value of the filter coefficient in the adaptive memory 10 with the value in the refuge memory 13, in other words when the replacement of the filter coefficient takes place because the adaptation of the current value is not proper, the interpolator 23 compare the first filter coefficient H (j) of the adaptive memory 10 and the second filter coefficient Hm (j) of the refuge memory 13, and calculates its difference and obtains an interpolation width DL (j), where, j=1, 2 . . . , J, in case that the interpolation is performed for M divisions according to formula (13). The resultant interpolation width DL (j) is stored in the refuge memory 13. Where, "J" represents the number of the taps of the adaptive filter.

$$DL(j) = \{Hm(j) - H(j)\}/M, \quad (13)$$

where, j=1,2, . . . J

Figures 7A, 7B, 7C:
FIGS. 7A~7C show diagrams which explain the operation of the coefficient substituter in the fourth embodiment of this invention.

FIG. 7A shows a timing chart of Ds (k) of the present fourth embodiment. FIG. 7B shows a timing signal for transferring the signal from H (j) to Hm (j) at the switching device 12. FIG. 7C shows a timing signal for interpolating H (j) at the interpolator 23.

In FIG. 6 and FIG. 7, H (j) shows the first filter coefficient of the adaptive memory 10, and Hm (j) shows the second filter coefficient of the refuge memory 13. If Ds (k) increases as shown in FIG. 7A, transfer timing pulses in FIG. 7B are generated in response to the increase of the Ds (k) and the first filter coefficient of the adaptive memory is transferred to the refuge memory 13 in order to store the first filter coefficient H (j) as a second filter coefficient Hm (j). On the other hand, if Ds (k) decreases as shown in FIG. 7A, many substitution timing pulses in FIG. 7C are generated in response to the decrease of the Ds (k) and the second filter coefficient of the refuge memory 13 is transferred to the adaptive memory 10 in order to substitute the second filter coefficient Hm (j) for the first filter coefficient H (j). In this case, the second filter coefficient of the refuge memory 13 is transferred to the adaptive memory 10 using many interpolation timing pulses as shown in FIG. 7C.

In the prior art, as stated above, if the first filter coefficient and the second filter coefficient value are largely different, the first filter coefficient changes largely at the moment when the substitution is carried out. Therefore, the output of the sum/product calculator 11 becomes discontinuous because the substitution is carried out by only one time substitution. Alteratively, in this embodiment, since the substitution of the first filter coefficient is carried out by M-time interpolation, that is, the substitution is carried out gradually, the discontinuity does not take place even if the first filter coefficient and the second filter coefficient value are largely different. The interpolator 23 controls to accumulate the interpolation width DL (j) to the filter coefficient in the adaptive memory 10, for every j, where, j=1, 2, . . . , J. As a result, after the interpolator 23 has carried out the interpolation for M times, the value of the filter coefficient in the adaptive memory 10 becomes equal to the value in the adaptive memory Hm (j), where, j=1, 2, . . . , J, before the interpolation begins.

Embodiment 5

In the embodiments 1, 2 and 3, the reception signal level Lrin (k), the transmission signal level Ltin (k) and the residual signal level Lres (k), which are calculated in the level calculators 5, 16 and 6, respectively, are the logarithmic conversion values of the power. However, in the fifth embodiment, the reception signal level Lrin (k), the transmission signal level Ltin (k) and the residual signal level Lres (k) can be replaced by the power level itself. In this fifth embodiment, in order that the adaptive controller 4 operates in the same manner as in embodiments 1, 2 and 3, the calculation according to formula (8) is changed to the formula (14), the calculation according to formula (9) is changed to the formula (15), the calculation of the conditional formula (10) is changed to the formula (16), the calculation of the conditional formula (11) is changed to the formula (18) and finally the calculation of the formula (12) is changed to the formula (20).

$$EG = \sum_{i=k-I+1}^{k} \{Ltin(i)/Lrin(i)\}/I \quad (14)$$

$$Lech(k) = Lrin(k) \times EG \quad (15)$$

$$Lech(k) \geq Lres(k) \times \alpha' \quad (16)$$

$$\alpha = 10^{\alpha/10} \quad (17)$$

$$Lech(k) \geq Lting(k)/\beta' \quad (18)$$

$$\beta' = 10^{\alpha/10} \quad (19)$$

$$ERLE = \sum_{i=k-K+1}^{k} \{Ltin(i)/Lres(i)\}/K \quad (20)$$

Embodiment 6

Further, the formula (14) for estimating the echo gain EG and the formula (20) for estimating the echo cancellation ERLE may be replaced by the formula (21) and the formula (22), respectively.

$$EG = \sum_{i=k-I+1}^{k} Ltin(i) \bigg/ \sum_{i=k-I+1}^{k} Lrin(i) \quad (21)$$

$$ERLE = \sum_{i=k-K+1}^{k} Ltin(i) \bigg/ \sum_{i=k-K+1}^{k} Lres(i) \quad (22)$$

What is claimed is:

1. An echo canceller including an echo level estimator in an adaptation controller which controls adaptation of an adaptive filter, said echo level estimator comprising:

a first level calculator for calculating logarithmically converted power of a reception signal level;

a second level calculator for calculating logarithmically converted power of a transmission signal level;

an echo gain estimator for estimating an echo gain based on the reception signal level and the transmission signal level;

an echo level estimating means for adding the echo gain to the reception signal level to obtain an estimated echo level; wherein said first level calculator calculates the reception signal level Lin(k) according to the following formula, $$Lrin(k) = \log_{10}\left\{\sum_{i=k-L+1}^{k} Rin(i)^2\right\}$$

where, k represents a certain time of digital signal, L represents a time for L-th sampling time, Rin(k) represents a reception signal at k, said second level calculator calculates the transmission signal level Ltin(k) according to the following formula, $$Ltin(k) = \log_{10}\left\{\sum_{i=k-L+1}^{k} Tin(i)^2\right\}$$

where, Tin(k) represents a transmission signal at k, said echo gain estimator estimating the echo gain EG according to the following formula, $$EG = \sum_{i=k-l+1}^{k} \{Ltin(i) - Lrin(i)\}/l$$

where, l represents an average sampling number which makes the estimated echo gain EG reliable, Ltin(i) represents a transmission signal level at i, Lrin(i) represents a reception signal level at i, and said echo level estimator outputs the estimated echo level Lech(k) according to the following formula Lech(k)=Lrin(k)+EG.

2. An echo canceller including an echo level estimator in an adaptation controller which controls adaptation of an adaptive filter, said echo level estimator comprising:

a first level calculator for calculating logarithmically converted power of a reception signal level;

a second level calculator for calculating logarithmically converted power of a transmission signal level;

an echo gain estimator for estimating an echo gain based on the reception signal level and the transmission signal level;

an echo level estimating means for adding the echo gain to the reception signal level to obtain an estimated echo level;

a third level calculator for calculating logarithmically converted power to a residual signal level; and a comparator for comparing the estimated echo level with the residual signal level after echo cancellation;

wherein the adaptation of the adaptive filter is activated when the estimated echo level exceeds a value obtained by adding a margin to the residual signal level;

said first level calculator calculates the reception signal level Lin(k) according to the following formula, $$Lrin(k) = \log_{10}\left\{\sum_{i=k-L+1}^{k} Rin(i)^2\right\}$$

said second level calculator calculates the transmitting signal level Ltin(k) according to the following formula, $$Ltin(k) = \log_{10}\left\{\sum_{i=k-L+1}^{k} Tin(i)^2\right\}$$

said third level calculator calculates the residual signal level Lres(k) according to the following formula, $$Lres(k) = \log_{10}\left\{\sum_{i=k-L+1}^{k} Res(i)^2\right\}$$

where Res(i) represents a residual signal in which the echo component is canceled, said echo gain estimator estimating the echo gain EG according to the following formula, $$EG = \sum_{i=k-l+1}^{k} \{Ltin(i) - Lrin(i)\}/l$$

and said echo level estimator outputs the estimated echo level Lech(k) according to the following formula Lech(k)=Lrin(k)+EG.

3. An echo canceller including an echo level estimator in an adaptation controller which controls adaptation of an adaptive filter, said echo level estimator comprising:

a first level calculator for calculating logarithmically converted power of a reception signal level;

a second level calculator for calculating logarithmically converted power of a transmission signal level;

an echo gain estimator for estimating an echo gain based on the reception signal level and the transmission signal level;

an echo level estimating means for adding the echo gain to the reception signal level to obtain an estimated echo level;

a third level calculator for calculating logarithmically converted power of a residual signal level;

a first comparator for comparing the estimated echo level with a residual signal level after echo cancellation;

a second comparator for comparing the estimated echo level with the transmission signal level;

a flag selector for selecting a first adaptive control flag outputted from said first comparator and a second adaptive control flag outputted from said second comparator; and an echo cancellation amount estimator for estimating an amount of echo cancellation from the transmission signal level and the residual signal level;

wherein the adaptation of the adaptive filter is activated if the estimated echo level exceeds the value obtained by adding the margin to the residual signal in case that the amount of the echo cancellation exceeds a threshold value, and the echo of the reception signal contained in the transmission signal is canceled if the estimated echo level exceeds the value obtained by subtracting a margin from the transmission signal in case that the amount of the echo cancellation does not exceed the threshold value;

said echo cancellation amount estimator outputs the estimated echo cancellation ERLE based on the transmission signal level Ltin(k) and the residual signal level Lres(k) according to the following formula, $$ERLE = \sum_{i=k-K+1}^{k} \{Ltin(i) - Lres(i)\}/K$$

where, Lres(k) represents a residual signal level at k.

4. An echo canceller comprising:

an adaptive memory for storing a first filter coefficient for adaptation which is updated from a transmission signal and a residual signal after echo cancellation;

a refuge memory for storing a second filter coefficient in the adaptive memory in parallel for predetermined sections while the adaptation is judged to be proper;

a coefficient substitutor for controlling whether the filter coefficient for the adaptation of the adaptive filter should be updated or not according to a difference between the transmission signal and the residual signal level;

an interpolator for interpolating, after comparing the value of the first filter coefficient in the adaptive memory with the value of the second filter coefficient in the refuge memory;

a filter coefficient updator for updating the first filter coefficient of said adaptive memory according to the transmission signal and the residual signal;

a sum/product calculator for generating a pseudo echo signal by carrying out a convolution operation according to the reception signal and the first filter coefficient stored in said adaptive memory; and an echo subtractor for subtracting the pseudo echo signal from the transmission signal to generate residual signal;

wherein, when said coefficient substitutor controls to substitute the value of the first filter coefficient by the value of the second filter coefficient in case that the adaptation is not proper, and said interpolator carries out interpolation and updates for a predetermined timing number so that the value of the first filter coefficient is continuous to the value of the second filter coefficient.

5. An echo canceller including an echo level estimator in an adaptation controller which controls adaptation of an adaptive filter, said echo level estimator comprising:

a first level calculator for calculating logarithmically converted power of a reception signal level;

a second level calculator for calculating logarithmically converted power of a transmission signal level;

an echo gain estimator for estimating an echo gain based on the reception signal level and the transmission signal level;

an echo level estimating means for adding the echo gain to the reception signal level to obtain an estimated echo level;

a third level calculator for calculating logarithmically converted power to a residual signal level; and a comparator for comparing the estimated echo level with the residual signal level after echo cancellation;

wherein the adaptation of the adaptive filter is activated when the estimated echo level exceeds a value obtained by adding a margin to the residual signal level;

said first level calculator calculates the reception signal level Lin(k) according to the following formula, $$Lrin(k) = \sum_{i=k-L+1}^{k} Rin(i)^2$$

said second level calculator calculates the transmitting signal level Ltin(k) according to the following formula, $$Ltin(k) = \sum_{i=k-L+1}^{k} Tin(i)^2$$

said third level calculator calculates the residual signal level Lres(k) according to the following formula, $$Lres(k) = \sum_{i=k-L+1}^{k} Res(i)^2$$

said echo gain estimator estimating the echo gain EG according to the following formula, $$EG = \sum_{i=k-I+1}^{k} \{Ltin(i)/Lrin(i)\}/I$$

and said echo level estimator outputs the estimated echo level Lech(k) according to the following formula Lech(k)=Lrin(k)×EG.

6. An echo canceller including an echo level estimator in an adaptation controller which controls adaptation of an adaptive filter, said echo level estimator comprising:

a first level calculator for calculating logarithmically converted power of a reception signal level;

a second level calculator for calculating logarithmically converted power of a transmission signal level;

an echo gain estimator for estimating an echo gain based on the reception signal level and the transmission signal level;

an echo level estimating means for adding the echo gain to the reception signal level to obtain an estimated echo level;

a comparator for comparing the estimated echo level with the transmitting signal level;

wherein the adaptation of the adaptive filter is activated when the estimated echo level exceeds the value obtained by subtracting a margin from the transmitting signal level;

said first level calculator calculates the reception signal level Lin(k) according to the following formula, $$Lrin(k) = \sum_{i=k-L+1}^{k} Rin(i)^2$$

said second level calculator calculates the transmitting signal level Ltin(k) according to the following formula, $$Ltin(k) = \sum_{i=k-L+1}^{k} Tin(i)^2$$

said echo gain estimating the echo gain EG according to the following formula, $$EG = \sum_{i=k-l+1}^{k} \{Ltin(i)/Lrin(i)\}/l$$

and said echo level estimator outputs the estimated echo level Lech(k) according to the following formula, Lech(*k*)=Lrin(*k*)×EG.

7. An echo canceller including an echo level estimator in an adaptation controller which controls adaptation of an adaptive filter, said echo level estimator comprising:
a first level calculator for calculating logarithmically converted power of a reception signal level;
a second level calculator for calculating logarithmically converted power of a transmission signal level;
an echo gain estimator for estimating an echo gain based on the reception signal level and the transmission signal level;
an echo level estimating means for adding the echo gain to the reception signal level to obtain an estimated echo level;
a third level calculator for calculating logarithmically converted power of a residual signal level;
a first comparator for comparing the estimated echo level with a residual signal level after echo cancellation;
a second comparator for comparing the estimated echo level with the transmission signal level;
a flag selector for selecting a first adaptive control flag outputted from said first comparator and a second adaptive control flag outputted from said second comparator; and
an echo cancellation amount estimator for estimating an amount of echo cancellation from the transmission signal level and the residual signal level;
wherein the adaptation of the adaptive filter is activated if the estimated echo level exceeds the value obtained by adding the margin to the residual signal in case that the amount of the echo cancellation exceeds a threshold value, and the echo of the reception signal contained in the transmission signal is canceled if the estimated echo level exceeds the value obtained by subtracting a margin from the transmission signal in case that the amount of the echo cancellation does not exceed the threshold value;
said first level calculator calculates the reception signal level Lin(k) according to the following formula, $$Lrin(k) = \sum_{i=k-L+1}^{k} Rin(i)^2$$

said second level calculator calculates the transmitting signal level Ltin(k) according to the following formula, $$Ltin(k) = \sum_{i=k-L+1}^{k} Tin(i)^2$$

said third level calculator calculates the residual signal level Lres(k) according to the following formula, $$Lres(k) = \sum_{i=k-L+1}^{k} Res(i)^2$$

said echo gain estimator estimating the echo gain EG according to the following formula, $$EG = \sum_{i=k-l+1}^{k} \{Ltin(i)/Lrin(i)\}/l$$

and said echo level estimator outputting the estimated echo level Lech(k) according to the following formula, and Lech(*k*)=Lrin(*k*)×EG said echo cancellation amount estimator outputting the estimated echo cancellation ERLE based on the transmission signal level Ltin(k) and the residual signal level Lres(k) according to the following formula, $$ERLE = \sum_{i=k-K+1}^{k} \{Ltin(i)/Lres(i)\}/K.$$

8. An echo canceller including an echo level estimator in an adaptation controller which controls adaptation of an adaptive filter, said echo level estimator comprising:
a first level calculator for calculating logarithmically converted power of a reception signal level;
a second level calculator for calculating logarithmically converted power of a transmission signal level;
an echo gain estimator for estimating an echo gain based on the reception signal level and the transmission signal level;
an echo level estimating means for adding the echo gain to the reception signal level to obtain an estimated echo level;
a third level calculator for calculating logarithmically converted power to a residual signal level; and
a comparator for comparing the estimated echo level with the residual signal level after echo cancellation;
wherein the adaptation of the adaptive filter is activated when the estimated echo level exceeds a value obtained by adding a margin to the residual signal level;
said first level calculator calculates the reception signal level Lin(k) according to the following formula, $$Lrin(k) = \sum_{i=k-L+1}^{k} Rin(i)^2$$

said second level calculator calculates the transmitting signal level Ltin(k) according to the following formula, $$Ltin(k) = \sum_{i=k-L+1}^{k} Tin(i)^2$$

said third level calculator calculates the residual signal level Lres(k) according to the following formula, $$Lres(k) = \sum_{i=k-L+1}^{k} Res(i)^2$$

said echo gain estimator estimates the echo gain EG according to the following formula, $$EG = \sum_{i=k+l+1}^{k} Ltin(i) \bigg/ \sum_{i=k+l+1}^{k} Lrin(i)$$

and said echo level estimator outputs the estimated echo level Lech(k) according to the following formula, Lech($k$)=Lrin($k$)×EG.

9. An echo canceller including an echo level estimator in an adaptation controller which controls adaptation of an adaptive filter, said echo level estimator comprising:

a first level calculator for calculating logarithmically converted power of a reception signal level;

a second level calculator for calculating logarithmically converted power of a transmission signal level;

an echo gain estimator for estimating an echo gain based on the reception signal level and the transmission signal level;

an echo level estimating means for adding the echo gain to the reception signal level to obtain an estimated echo level;

a comparator for comparing the estimated echo level with the transmitting signal level; wherein the adaptation of the adaptive filter is activated when the estimated echo level exceeds the value obtained by subtracting a margin from the transmitting signal level;

said first level calculator calculates the reception signal level Lin(k) according to the following formula, $$Lrin(k) = \sum_{i=k-L+1}^{k} Rin(i)^2$$

said second level calculator calculates the transmitting signal level Ltin(k) according to the following formula, $$Ltin(k) = \sum_{i=k-L+1}^{k} Tin(i)^2$$

said echo gain estimator estimates the echo gain EG according to the following formula, $$EG = \sum_{i=k+l+1}^{k} Ltin(i) \bigg/ \sum_{i=k+l+1}^{k} Lrin(i)$$

and said echo level estimator outputs the estimated echo level Lech(k) according to the following formula, Lech($k$)=Lrin($k$)×EG.

10. An echo canceller including an echo level estimator in an adaptation controller which controls adaptation of an adaptive filter, said echo level estimator comprising:

a first level calculator for calculating logarithmically converted power of a reception signal level;

a second level calculator for calculating logarithmically converted power of a transmission signal level;

an echo gain estimator for estimating an echo gain based on the reception signal level and the transmission signal level;

an echo level estimating means for adding the echo gain to the reception signal level to obtain an estimated echo level;

a third level calculator for calculating logarithmically converted power of a residual signal level;

a first comparator for comparing the estimated echo level with a residual signal level after echo cancellation;

a second comparator for comparing the estimated echo level with the transmission signal level;

a flag selector for selecting a first adaptive control flag outputted from said first comparator and a second adaptive control flag outputted from said second comparator; and an echo cancellation amount estimator for estimating an amount of echo cancellation from the transmission signal level and the residual signal level;

wherein the adaptation of the adaptive filter is activated if the estimated echo level exceeds the value obtained by adding the margin to the residual signal in case that the amount of the echo cancellation exceeds a threshold value, and the echo of the reception signal contained in the transmission signal is canceled if the estimated echo level exceeds the value obtained by subtracting a margin from the transmission signal in case that the amount of the echo cancellation does not exceed the threshold value;

said first level calculator calculates the reception signal level Lin(k) according to the following formula, $$Lrin(k) = \sum_{i=k-L+1}^{k} Rin(i)^2$$

said second level calculator calculates the transmitting signal level Ltin(k) according to the following formula, $$Ltin(k) = \sum_{i=k-L+1}^{k} Tin(i)^2$$

said third level calculator calculates the residual signal level Lres(k) according to the following formula, $$Lres(k) = \sum_{i=k-L+1}^{k} Res(i)^2$$

said echo gain estimator estimates the echo gain EG according to the following formula, and $$EG = \sum_{i=k+l+1}^{k} Ltin(i) \bigg/ \sum_{i=k+l+1}^{k} Lrin(i)$$

said echo level estimator outputs the estimated echo level Lech)k) according to the following formula, Lech(k)=Lrin(k)×EG said echo cancellation amount estimator outputs the estimated echo cancellation ERLE based on the transmission signal level Ltin(k) and the residual signal level Lres)k) according to the following formula, $$ERLE = \sum_{i=k-K+1}^{k} Ltin(i) \bigg/ \sum_{i=k-K+1}^{k} Lres(i).$$

* * * * *